United States Patent [19]

Buyny et al.

[11] Patent Number: 5,248,711
[45] Date of Patent: Sep. 28, 1993

[54] TOUGHENED RESIN SYSTEMS FOR COMPOSITE APPLICATIONS

[75] Inventors: Robert A. Buyny, Clayton; Karen A. Olesen, Pleasanton, both of Calif.

[73] Assignee: Hexcel Corporation, Pleasanton, Calif.

[21] Appl. No.: 312,016

[22] Filed: Feb. 16, 1989

[51] Int. Cl.$^5$ .................. C08L 79/08; C08K 3/40; C08J 5/24
[52] U.S. Cl. .................. 523/500; 523/527; 524/538; 524/539; 525/422; 525/432; 525/928
[58] Field of Search .................. 535/422–432, 535/928, 929; 524/538, 539; 523/500, 527; 428/327

[56] References Cited

U.S. PATENT DOCUMENTS

| | | | |
|---|---|---|---|
| 4,100,140 | 7/1978 | Zahir | 526/90 |
| 4,132,747 | 1/1979 | Watanabe et al. | 260/857 PE |
| 4,144,284 | 3/1979 | Semanaz et al. | 260/857 PA |
| 4,276,352 | 6/1981 | Green | 428/473.5 |
| 4,351,932 | 9/1982 | Street et al. | 526/262 |
| 4,393,177 | 7/1983 | Ishii et al. | 525/422 |
| 4,410,664 | 10/1983 | Lee | 525/180 |
| 4,468,497 | 8/1984 | Street et al. | 525/422 |
| 4,604,319 | 8/1986 | Evans | 428/290 |
| 4,654,407 | 3/1987 | Domeier | 526/262 |
| 4,721,639 | 1/1988 | Shimp et al. | 428/40 |
| 4,774,282 | 9/1988 | Qureshi | 524/606 |

FOREIGN PATENT DOCUMENTS 0274899  7/1988  European Pat. Off. .

OTHER PUBLICATIONS

J. A. Nairn, "The Initiation of Microcracking in Cross--Ply Laminates: A Variational Mechanics Analysis," pp. 472–481.

Stenzenberger et al., "Toughened Bismaleimides: Modification with Thermoplastics," International SAMPE Symposium, Mar. 7-10, 1988.

Ciba-Geigy Plastics Department Product Data Matrimid 5218, 1985.

Dupont HVA-2; No. 59A. (undated).

High Performance Powder P84 General Information (undated).

Mitsui Toatsu Chemicals, Inc. High Performance Polyimide LARC-TPI (undated).

Celanese PBI Polybenzimidazole Polymer, 1984.

Ciba-Geigy Plastics Department Product Data Matrimid 5292 System (undated).

Primary Examiner—Paul R. Michl
Assistant Examiner—Peter Szekely
Attorney, Agent, or Firm—Townsend and Townsend Khourie and Crew

[57] ABSTRACT

Thermosetting resins for use in high performance fiber-reinforced composites are toughened without compromising their processability by the inclusion of micron-sized particles of thermoplastic material which are solid at ambient temperatures but solubilize in the resins at a temperature below the gel temperature of the thermosetting resin. By appropriate selection of the solubilization temperature (or temperature range) of the thermoplastic material, one achieves a composite product having intralaminar or interlaminar toughness emphasized or a combination of both. The invention is of particular utility when applied to bismaleimide resin systems.

47 Claims, No Drawings

TOUGHENED RESIN SYSTEMS FOR COMPOSITE APPLICATIONS

This invention relates to thermoset resin systems for use in high-performance fiber-resin composites.

BACKGROUND OF THE INVENTION

Thermosetting resins are widely used in the formation of fiber-reinforced structural materials due to their ability to withstand high temperatures. These materials provide the high strength and high temperature capability needed in such applications as military aircraft.

Thermosetting resins which have been used in this context include epoxy resins and bismaleimide resins. The latter are particularly beneficial due to their high glass transition temperature their high capability of withstanding hot wet environments, and their low smoke and toxicant emission.

The beneficial properties of thermosetting resins are unfortunately offset by a brittleness or low toughness resulting in low damage tolerance. Toughness is extremely important in high-performance structures, since high loads must be borne both within the plane of the composite and in directions normal to the plane of the composite. Among the solutions offered for increasing toughness are the use of thermoplastics in combination with the thermosetting resins. This usually occurs, however, at the expense of processability, the thermoplastic additive causing an increase in the viscosity and the softening point of the material.

SUMMARY OF THE INVENTION

It has now been discovered that thermosetting resins for use in fiber-resin composites may be made with increased toughness while maintaining a high level of processability, by the use of minute particles of a thermoplastic material dispersed throughout the thermosetting resin, the thermoplastic material being one which is solid at ambient temperatures but dissolves in the thermosetting resin at a temperature below the gel temperature of the thermosetting resin. The dissolved thermoplastic phase separates during cure of the thermosetting resin, and forms substantially discrete domains throughout the cured resin.

It has further been discovered that the toughness character of the resulting product can be tailored t specific needs in terms of the type of load to be borne by the product. This is done by judicious selection of the chemical and physical nature of the thermoplastic particles. Those with higher solubilization temperatures in the thermoset resin will produce a product in which interlaminar toughness (i.e., between the plies) is emphasized. Interlaminar toughness is evidenced by such qualities as the ability to withstand high energy impact. Those with lower solubilization temperatures will produce a product in which intralaminar (within the ply) toughness is emphasized. This is evidenced by such qualities as increased resistance to microcracking and edge delamination.

Further aspects of the invention, as well as further embodiments and advantages will be apparent from the description which follows.

DETAILED DESCRIPTION OF THE INVENTION AND PREFERRED EMBODIMENTS

The present invention is applicable to a wide range of thermosetting resins, typically thermosetting resins having gel temperatures ranging from about 300° F. to about 400° F. (149°–204° C.).

Regarding the chemical structure of the thermosetting resin, bismaleimide-based resin systems are preferred. Co-reactants for use with the bismaleimides may include any of a wide variety of unsaturated organic compounds, particularly those having multiple unsaturation. either ethylenic, acetylenic or both. Examples are acrylic acids and amides and the associated esters, such as acrylic acid, methacrylic acid, methylmethacrylate, acrylamide and methacrylamide. Further examples are dicyanoethylene, tetracyanoethylene, allyl alcohol, 2.2'-diallylbisphenol A, 2.2'-dipropenylbisphenol A, diallylphthalate, triallylisocyanurate, triallylcyanurate, N-vinyl-2-pyrrolidinone, N-vinyl caprolactam, ethylene glycol dimethacrylate, diethylene glycol dimethacrylate trimethylolpropane triacrylate, trimethylolpropane trimethacrylate pentaerythritol tetramethacrylate, 4-allyl-2-methoxyphenol, triallyl trimellitate divinyl benzene, dicyclopentadienyl acrylate, dicyclopentadienyloxyethyl acrylate, 1,4-butanediol divinyl ether, 1,4-dihydroxy-2-butene, styrene, $\alpha$-methyl styrene, chlorostyrene, p-phenylstyrene, p-methylstyrene, t-butylstyrene, and phenyl vinyl ether. Of particular interest are resin systems employing a bismaleimide in combination with a bis(alkenylphenol). Descriptions of a typical resin system of this type are found in Zahir, et al., U.S. Pat. No. 4,100,140, issued Jul. 11, 1978. incorporated herein by reference. Particularly preferred components are 4,4'-bismaleimidodiphenylmethane and o,o'-diallyl bisphenol A.

Other ingredients will generally be included among the thermosetting resin components in accordance with conventional technology well known among those skilled in the art of processing such materials. These ingredients include, for example, curing agents, processing aids and the like. The relative proportions of all such components, including the comonomers, are further in accordance with the conventional technology.

The thermoplastic materials may vary widely as well. Selection of the optimum thermoplastic material for any particular application will depend to some extent on the thermosetting resin system used, as well as the particular characteristics sought in the final product. Preferred thermoplastic materials are those that become soluble in the thermosetting resin at a temperature within 100 degrees F. (56 degrees C.) of the gel temperature of the thermosetting resin.

Comparing the thermosetting and thermoplastic materials with each other, preferred combinations are those in which each of these materials has a solubility parameter, $\delta$, falling within about 2 $(cal/cc)^{1/8}$ of the solubility parameter of the other. In particularly preferred embodiments, the solubility parameter of each of the two materials will fall within the range of about 10 to about 12 $(cal/cc)^{1/8}$. In addition, it is preferred that the glass transition temperatures of the two materials be comparable, most preferably that the glass transition temperature of the thermoplastic material be no more than 20 degrees C. below that of the thermosetting material matrix.

Polyimides are preferred as the thermoplastic material, preferably those formed by the reaction between a dianhydride and a diamine. A preferred dianhydride is benzophenonetetracarboxylic dianhydride, and a preferred diamine is 5(6)-amino-1-(4'-aminophenyl)-1,3,3-trimethylindane.

The thermoplastic material is in the form of solid particles prior to formulation of the resin. The size of the particles may be varied to control their solubilization characteristics, notably the speed of solubilization and effectively the solubilization temperature as well. The density and other physical characteristics of the particles may likewise be varied for the same purposes. These qualities may be controlled by selection of the particles and by methods of their formation. For example, the particles may be formed by crushing or grinding under cryogenic conditions. The particles may also be formed by suspension precipitation. This may be done by dissolving the thermoplastic material in a suitable solvent, dispersing the resulting solution through a liquid phase in which the thermoplastic material is not soluble and which is less than fully miscible with the solvent. The dispersion is then agitated to produce droplets of the desired size, then heated to evaporate the solvent, causing the thermoplastic material to solidify in the form of particles of a narrow size range and relatively dense nature. Such particles will generally exhibit a narrow solubilization temperature range in the thermosetting resin. Furthermore, the processing parameters in forming the particles in this manner may be controlled and varied to place the solubilization temperature within a particular range. For most applications, particles having a size less than about 100 microns in diameter will provide the best results. Particles of about 2 microns to about 50 microns in diameter, particularly those of about 10 microns to about 20 microns in diameter, are preferred.

In applications where intralaminar toughness is of prime importance, thermoplastic particles which solubilize at a temperature well below the gel temperature are preferred. These are applications where microcracking is a major concern. Solubilization will generally occur throughout a range of temperature, and the upper limit of the range for this type of application will typically be about 50 to 100 degrees F. (28–56 degrees C.) below the gel temperature of the resin. For those applications where interlaminar toughness is of prime importance, particles solubilizing at a higher temperature, such as above 50 degrees F. (28 degrees C.) below the gel temperature of the resin, are preferred. These are applications where the composite is likely to be subject to impact damage from foreign objects. This type of thermoplastic will tend to be more concentrated in regions adjacent to the surface of the ply. The upper limit of the solubilization temperature range for these applications may be within about 10 degrees F. (6 degrees C.) of, if not the same as, the gel temperature. The solubilization temperature range may be varied by a variety of methods readily apparent to those skilled in the art. For example, minor amounts of thermoset resin may be incorporated into the thermoplastic material to lower the solubilization temperature. Alternatively, minor amounts of insoluble polymer or a cross-linkable polymer may be incorporated to raise the solubilization temperature. To achieve both effects in a single product a combination of the two types of particles may be used.

The relative amounts of thermoplastic material and thermosetting resin may vary, depending on the qualities sought for the final composite. In most applications, about 2 to about 50 parts by weight of thermoplastic material per 100 parts by weight of thermosetting resin will provide the best results. A preferred range is about 5 to about 30 parts per 100 parts.

The compositions of the present invention are used in the formation of "prepregs" (fiber networks preimpregnated with resin) and cured composites according to conventional techniques. Typically, the resin composition is first prepared by mixing the thermosetting ingredients and adding the thermoplastic particles, which are mixed in with the thermosetting ingredients to form a uniform dispersion. The composition is then fed concurrently with the fiber network which is in the form of fiber strands mat, tape, yarn or cloth, through a series of heated pressure rollers, using temperatures and pressures selected as appropriate for the particular fibers and resin composition, which is within the routine skill of those skilled in the art. Other techniques involve drawing the fiber network through a dip tank containing the resin composition in the form of a solution or dispersion, followed by evaporation of the solvent (if a solution is used) or continuous phase (if a dispersion is used). Again, the selection of the solvent or continuous phase is within the routine skill of the art. A further alternative is by infusion, wherein the resin composition may be applied as a thick film to a woven fabric fiber network.

The resin compositions may be formed into structural elements in conventional ways, such as by the use of laminating presses, vacuum and pressure bag molding, and autoclaves. Multilayered elements are particularly useful in many cases since such arrangements permit the use of combinations of layers varying in resin composition, fiber type and content and the various other parameters that define the composite, thereby permitting one to select among a wide range of physical, chemical and thermal properties.

The following examples are offered by way of illustration, and are intended neither to limit nor to define the invention in any manner.

EXAMPLE 1

A resin was prepared from the following components:

| Component no. | Parts by Weight | Material | Supplier |
| --- | --- | --- | --- |
| (1) | 80.00 | Matrimid 5292 Component A (4,4'-bismaleimido-diphenylmethane) | Ciba-Geigy |
| (2) | 61.40 | Matrimid 5292 Component B (o,o'-diallyl bisphenol A) | Ciba-Geigy |
| (3) | 20.00 | HVA-2 (N,N'-m-phenylene-dimaleimide) | DuPont |
| (4) | 18.00 | Matrimid 5218 (polyimide of benzophenonetetracarboxylic dianhydride and 5(6)-amino-1-(4'-aminophenyl)-1,3,3-trimethylindane polyimide), ground to particles <40 μ diam. | Ciba-Geigy |
| (5) | 1.25 | polyethylene oxide, molec. wt. 60,000 | |

The particle sizing and composition of the Matrimid 5218 was such that it would dissolve in the resin within a temperature range of 250°–300° F. (121°–149° C.). The solubility parameter of the undured resin, calculated by the method of Hoy (*The Polymer Handbook*, 2d ed.) was 11.9 (cal/cc)$^{178}$ while that of the Matrimid 5218 was 11.1 (cal/cc)$^{178}$. The remaining components produced a resin which gelled at approximately 350° F. (177° C.).

Components (1), (3) and (5) were combined with component (2) (the Matrimid 5292 Component B), which was liquid, while maintaining the mix temperature at 120°–140° F. (49°–60° C.). Once these components were combined, the temperature was increased to 240° F. (116° C.), held at that temperature for 30 minutes after which time the mixture was cooled to 200° F. (93° C.), component (4) was added, and the resulting mixture subsequently cooled. The resulting mixture was cast into resin films, approximately 1 mil in thickness, on release paper at 200° F. (93° C.), using a reverse roll film caster. One of these films was then placed on each side of a 0.003 inch (0.0076 cm) thick sheet of collimated Thornel T 40 graphite fibers in a sandwich-type arrangement. The sandwich was then rolled between pressure rolls heated to 200° F. (93° C.) to form a unidirectional graphite fiber tape.

The tape was then cured for four hours at 375° F. (191° C.), then post cured for 16 hours at 450° F. (232° C.). The glass transition temperature of this cured product was 518° F. (270° C.), while the Matrimid 5218, as reported in its product literature, had a glass transition temperature of 608° F. (320° C.). The cured product exhibited a uniform laminate microstructure, as observed by photomicrograph of a cross section, with full and uniform penetration of the cured resin into the fiber matrix. Discrete thermoplastic domains ranging from 0.5 to 5 microns in diameter were visible throughout the thermoset matrix by way of a scanning electron microscopy (S.E.M.) photomicrograph.

Toughness tests were performed on the cured product using the *General Dynamics Standard Test for Advanced Composites B*-201 (edge delamination test) and *Boeing Standard Method BSS* 7260 (compression-after-impact test). The test results were as follows:

| | |
|---|---|
| Edge delamination strength (($\pm$25)$_2$, 90)$_s$; 0.75 × 11 in. coupon Compression-after-impact: (45, 0, −45, 90)$_{4s}$, 4 × 6 in. coupon | 31.80 ksi |
| damage area | 8.50 in$^2$ |
| compression strain | 2852 $\mu$in/in |

The high edge delamination strength figure is of particular interest in terms of intralaminar toughness within the cured fiber-reinforced resin.

EXAMPLE 2

This example illustrates the use of a thermoplastic material which dissolves in the thermosetting resin at a temperature closer to the gel temperature of the thermosetting resin, with the aim of producing a fiber-reinforced sheet of layered structure emphasizing increased interlaminar toughness when laminated with other such sheets.

The thermoplastic materials was prepared in the form of microspheres as follows. An aqueous phase was prepared by dissolving 7.5 g of polyvinyl alcohol (as a 1.31 weight percent solution) in 565 mL of deionized water, followed by the addition of 7.5 mL of glycerine. An organic phase was prepared by dissolving 75 g of Matrimid 5218 described in Example 1 above in 300 mL of methylene chloride. The two phases were combined and mixed at high speed. An aspirator was then applied to achieve a stable vacuum of 4–6 in. Hg, and the mixture was heated sufficiently to evaporate all methylene chloride. The resulting mixture was then cooled to room temperature with a water bath, whereupon the polyimide precipitated out as densified microspheres. The microspheres were sized to <40$\mu$ diameter, and were soluble in the resin at within a temperature range of 300°–350° F. (149°–177° C.).

The resin was then prepared from the following components:

| Component no. | Parts by Weight | Material |
|---|---|---|
| (1) | 80.00 | Matrimid 5292 Component A |
| (2) | 61.40 | Matrimid 5292 Component B |
| (3) | 20.00 | HVA-2 |
| (4) | 40.00 | Matrimid 5218, spheres of <40$\mu$ diameter |

Using these components the procedure of Example 1 was repeated. As in that example, the calculated solubility parameter of the uncured resin was 11.9 (cal/cc)$^{178}$ as compared to 11.1 (cal/cc)$^{\frac{1}{2}}$ for the Matrimid 5218. Similarly, the cured material had a glass transition temperature of 518° F. (270° C.) as compared with a literature value of 608° F. (320° C.) for the Matrimid 5218. The cured product exhibited a layered microstructure with resin-rich regions on the two sides and a fiber-rich region in between. Multiple phases were observed by way of S.E.M. photomicrography, the thermoplastic domains being 0.5 to 5 microns in diameter.

Toughness tests were performed as in Example 1, with the following results:

| | |
|---|---|
| Edge delamination strength (($\pm$25)$_2$, 90)$_s$; 0.75 × 11 in. coupon Compression-after-impact: (45, 0, −45, 90)$_{4s}$, 4 × 6 in. coupon | 24.40 ksi |
| damage area | 2.10 in$^2$ |
| compression strain | 6066 $\mu$in/in |

The compression-after-impact figures, i.e., low damage area and high compression strain, are is of particular interest in terms of interlaminar toughness within the cured fiber-reinforced resin.

The foregoing is offered primarily for purposes of illustration. It will be readily apparent to those skilled in the art that modifications to and substitutions in the materials and procedures disclosed herein may be made without departing from the spirit and scope of the invention.

What is claimed is:

1. A process for the preparation of a fiber-resin composite, comprising:
   (a) combining thermosetting resin components at a mixing temperature to form a thermosetting resin which forms a gel at a gel temperature above said mixing temperature;

(b) dispersing solid particles through said thermosetting resin to form a dispersion said solid particles being of a thermoplastic material which dissolves in said thermosetting resin at a temperature between said mixing temperature and said gel temperature;

(c) impregnating a fiber matrix with said dispersion;

(d) curing said thermosetting resin; and (e) cooling said cured resin to ambient temperature.

2. A process in accordance with claim 1 in which said thermosetting resin components include a bismaleimide.

3. A process in accordance with claim 1 in which said thermosetting resin components include a bismaleimide and an unsaturated organic compound.

4. A process in accordance with claim 1 in which said thermosetting resin components include a bismaleimide and an unsaturated organic compound containing multiple unsaturations.

5. A process in accordance with claim 1 in which said thermoplastic material has a glass transition temperature no less than 20 degrees C. below the glass transition temperature of said thermosetting material.

6. A process in accordance with claim 1 in which said thermoplastic material and said thermosetting material both have solubility parameters no more than about 2 $(cal/cc)^{178}$ apart.

7. A process in accordance with claim 1 in which said thermosetting resin components include a bismaleimide and an alkenylphenol.

8. A process in accordance with claim 1 in which said thermosetting resin components include 4,4'-bis-maleimidodiphenylmethane.

9. A process in accordance with claim 1 in which said thermosetting resin components include a bismaleimide and a bis(alkenylphenol).

10. A process in accordance with claim 1 in which said thermosetting resin components include 4,4'-bis-maleimidodiphenylmethane and o,o'-diallyl bisphenol A.

11. A process in accordance with claim 1 in which said thermosetting resin components include a bismaleimide and an alkenylphenol, and said thermoplastic material is a thermoplastic polyimide.

12. A process in accordance with claim 11 in which said thermoplastic polyimide is formed from a dianhydride and a diamine.

13. A process in accordance with claim 11 in which said thermoplastic polyimide is formed by full imidization of a dianhydride by a diamine.

14. A process in accordance with claim 11 in which said thermoplastic polyimide is formed from benzophenonetetracarboxylic dianhydride and a diamine.

15. A process in accordance with claim 11 in which said thermoplastic polyimide is formed from benzophenonetetracarboxylic dianhydride and 5(6)-amino-1-(4'-aminophenyl)-1,3-trimethylindane.

16. A process in accordance with claim 11 in which said thermoplastic polyimide is formed by full imidization of benzophenonetetracarboxylic dianhydride with 5(6)-amino-1-(4'-aminophenyl)-1,3-trimethylindane.

17. A process in accordance with claim 1 in which said thermosetting resin components include a bismaleimide and an alkenylphenol, and said thermoplastic material is a polyimide formed from a dianhydride and a diamine.

18. A process in accordance with claim 1 in which said thermosetting resin components include 4,4'-bis-maleimidophenylmethane and o,o'-diallyl bisphenol A, and said thermoplastic material is a polyimide formed from benzophenonetetracarboxylic dianhydride and 5(6)-amino-1-(4'-aminophenyl)-1,3trimethylindane.

19. A process in accordance with claim 1 in which said solid particles dissolve in said thermosetting resin at a temperature within 100 degrees F. of said gel temperature.

20. A process in accordance with claim 1 in which said solid particles dissolve in said thermosetting resin at a temperature within 50 degrees F. of said gel temperature.

21. A process in accordance with claim 1 in which said gel temperature is from about 300° F. to about 400° F.

22. A process in accordance with claim 1 in which said solid particles are less than 100 microns in diameter.

23. A process in accordance with claim 1 in which said solid particles are from about 2 microns to about microns in diameter.

24. A process in accordance with claim 1 in which said solid particles are from about 10 microns to about 20 microns in diameter.

25. A process in accordance with claim 1 in which said solid particles comprise from about 2 to about 30 parts by weight per 100 parts by weight of said thermosetting resin components.

26. A process in accordance with claim 1 in which said solid particles comprise from about 5 to about 20 parts by weight per 100 parts by weight of said thermosetting resin components.

27. A fiber-resin composite comprising a fiber matrix impregnated with a solid material comprising:

a continuous phase rich in a thermoset substance formed from a thermosetting resin formed by combining thermosetting resin components at a mixing temperature, which thermosetting resin forms a gel at a gel temperature above said mixing temperature; and a dispersed phase rich in a thermoplastic substance which dissolves in said thermosetting resin at a temperature between said mixing temperature and said gel temperature.

28. A fiber-resin composite in accordance with claim 27 in which said thermoplastic substance has a glass transition temperature no less than 20 degrees C. below the glass transition temperature of said thermoset substance.

29. A fiber-resin composite in accordance with claim 27 in which said thermoplastic substance and said thermoset substance both have solubility parameters ranging from about 10 to about 12 $(cal/cc)^{178}$.

30. A fiber-resin composite in accordance with claim 27 in which said thermosetting resin components include a bismaleimide.

31. A fiber-resin composite in accordance with claim 27 in which said thermosetting resin components include a bismaleimide and an unsaturated organic compound.

32. A fiber-resin composite in accordance with claim 27 in which said thermosetting resin components include a bismaleimide and an unsaturated organic compound containing multiple unsaturations.

33. A fiber-resin composite in accordance with claim 27 in which said thermosetting resin components include a bismaleimide and an alkenylphenol.

34. A fiber-resin composite in accordance with claim 27 in which said thermosetting resin components include 4,4'-bismaleimidodiphenylmethane.

35. A fiber-resin composite in accordance with claim 27 in which said thermosetting resin components include a bismaleimide and a bis(alkenylphenol).

36. A fiber-resin composite in accordance with claim 27 in which said thermosetting resin components include 4,4'-bismaleimidodiphenylmethane and o,o'-diallyl bisphenol A.

37. A fiber-resin composite in accordance with claim 27 in which said thermosetting resin components include a bismaleimide and an alkenylphenol, and said thermoplastic substance is a thermoplastic polyimide.

38. A fiber-resin composite in accordance with claim 37 in which said thermoplastic polyimide is formed from a dianhydride and a diamine.

39. A fiber-resin composite in accordance with claim 37 in which said thermoplastic polyimide is formed by full imidization of a dianhydride by a diamine.

40. A fiber-resin composite in accordance with claim 37 in which said thermoplastic polyimide is formed from benzophenonetetracarboxylic dianhydride and a diamine.

41. A fiber-resin composite in accordance with claim 37 in which said thermoplastic polyimide is formed from benzophenonetetracarboxylic dianhydride and 5(6)-amino-1-(4'-aminophenyl)-1,3-trimethylindane.

42. A fiber-resin composite in accordance with claim 37 in which said thermoplastic polyimide is formed by full imidization of benzophenonetetracarboxylic dianhydride with 5(6)-amino-1-(4'-aminophenyl)-1,3-trimethylindane.

43. A fiber-resin composite in accordance with claim 27 in which said thermosetting resin components include a bismaleimide and an alkenylphenol, and said thermoplastic substance is a polyimide formed from a dianhydride and a diamine.

44. A fiber-resin composite in accordance with claim 27 in which said thermosetting resin components include 4,4'-bismaleimidophenylmethane and o,o'-diallyl bisphenol A, and said thermoplastic substance is a polyimide formed from benzophenonetetracarboxylic dianhydride and 5(6)-amino-1-(4'-aminophenyl)-1,3-trimethylindane.

45. A fiber-resin composite in accordance with claim 27 in which said thermoplastic substance dissolves in said thermosetting resin at a temperature within 100 degrees F. of said gel temperature.

46. A fiber-resin composite in accordance with claim 27 in which said thermoplastic substance dissolves in said thermosetting resin at a temperature within 50 degrees F. of said gel temperature.

47. A fiber-resin composite in accordance with claim 27 in which said gel temperature is from about 300° F. to about 400° F.

* * * * *